United States Patent Office 3,347,683
Patented Oct. 17, 1967

3,347,683
TREATMENT OF FRUITS AND THE LIKE TO INHIBIT DECAY
Albert J. Kraght, Glendora, Calif., and Henry C. Marks, Glen Ridge, N.J., assignors to Wallace & Tiernan Inc., Belleville, N.J., a corporation of Delaware
No Drawing. Filed Dec. 3, 1963, Ser. No. 327,832
21 Claims. (Cl. 99—156)

ABSTRACT OF THE DISCLOSURE

It has been discovered that an aqueous wash containing a cobalt compound, such as cobalt compounds selected from the group consisting of cobalt oxides, cobalt hydroxides and cobalt salts of inorganic and organic acids, are effective for the post-harvest treatment of raw fruits and the like to inhibit decay due to fungal and/or bacterial action during shipment and/or storage. Specific cobalt compounds found to be effective include cobaltous carbonate, cobaltous chloride, cobaltous acetate, cobaltous sulfate and cobaltous formate. Fruits and the like applicable for treatment in accordance with this invention include the citrus fruits, such as lemons, oranges, grapes, limes, tangerines, also, peaches, cherries, nectarines, apricots, plums and melons, such as cantaloupes, watermelons, honeydew melons, Persian melons and Cranshaw melons.

---

This invention relates to the treatment of fruits and the like. More particularly, this invention relates to the post-harvest treatment of raw fruits and the like to inhibit decay during shipment and/or storage. Still more particularly, this invention relates to the post-harvest treatment of raw fruits for the prevention of fungal and/or bacterial decay during shipment and/or storage.

Raw fruits have been treated by dipping the same in a tank of an aqueous wash containing a decay preventing agent or by spraying or foaming with an aqueous wash containing the decay preventing agent. The particular method of treatment employed usually depends upon the type of produce.

Washes heretofore employed have contained orthophenylphenol or a water soluble derivative thereof as the decay preventing agent, or, in the case of the treatment of citrus fruits, soda ash or borax have been dissolved in the wash as the decay preventing agent. Also it is the general practice to include in the wash a surfactant or detergent to improve the washing or treating operation.

It is an object of this invention to provide an improved method of treating fruits and the like to inhibit decay during shipment and/or storage.

Another object of this invention is to provide a method of protecting fruits from fungal and bacterial attack during shipment and/or storage.

Still another object of this invention is to provide an economic, practical and readily applicable method for the treatment of fruits to protect the same against fungal and bacterial attack during shipment and/or storage.

How these and other objects of this invention are obtained will become apparent in the light of the accompanying disclosure.

It has now been discovered that an improved method of treating raw fruits and the like to inhibit decay during shipment and/or storage is provided by contacting raw fruit and the like with an aqueous wash containing a cobalt compound. More particularly, it has been found that an improved method of protecting raw fruits and the like from decay during shipment and/or storage is obtained by contacting raw fruits with an aqueous wash containing a cobalt compound in dispersion. Ordinarily, even with the so-called insoluble cobalt compounds, at least a very small concentration of the cobalt compound (and the cobalt portion thereof) is present in molecular dispersion, that is, dissolved in the aqueous wash. For example, cobaltous carbonate which is substantially water insoluble and which has a room temperature solubility in water yielding a dissolved cobalt concentration of the order of one part per million by weight, is highly effective in the practice of this invention to inhibit decay. In any event, with the insoluble cobalt compounds, an amount of the solid undissolved cobalt compound should remain dispersed in the wash or at least with the portion of the wash which is being used to treat the fruit. It has been found that, when solid particles of such less soluble cobalt compounds are maintained in dispersion in the wash used for treatment, decay is prevented or substantially inhibited, whether by continual replenishment of the small amounts of cobalt actually dissolved in the wash or by contact of the solid particles themselves with the fruit surfaces. With the more soluble cobalt compounds, there is no difficulty in maintaining an effective concentration of cobalt in molecular dispersion (solution) in the wash.

Cobalt-containing compounds which are useful in the practice of this invention include cobaltous acetate, cobaltous ammonium phosphate, cobaltous ammonium sulfate, cobaltous carbonate, basic cobaltous carbonate, cobaltous chloride, cobaltous citrate, cobaltous formate, cobaltous hydroxide, cobaltous nitrate, cobaltous oxide, cobaltous phosphate, cobaltous potassium sulfate, cobaltous sulfate and cobaltous tartrate and others. In general, cobalt compounds selected from the group consisting of cobalt oxides, cobalt hydroxides and the cobalt salts of acids whose anions are non-toxic are useful and preferred.

Usually the selection of the cobalt-containing compound employed in the practice of this invention will be governed by availability and cost considerations, other factors remaining unchanged. Accordingly, the cheaper cobalt-containing compound is more likely to be used in the practice of this invention. Further, it is not necessary that the cobalt-containing compound be chemically pure. Commercial grade cobalt-containing compounds yield satisfactory results. The anion or other portion or component of the cobalt-containing compounds, however, must be selected with due care and those anions or components are to be avoided which are deleterious to the fruit undergoing treatment or which yield a toxic residue or which have not been approved or for other reasons.

The practice of this invention is generally applicable to all fruits, including citrus fruits, such as lemons, oranges, grapefruit, tangerines, limes and the like, also stone fruits such as peaches, nectarines, cherries, apricots, plums, also pome fruits such as apples, pears and quinces, also grapes and other berry fruits such as tomatoes. Further the practice of this invention is applicable to the treatment of melons, such as cantaloupes, watermelons, honeydew melons, Persian melons, Cranshaw melons and the like.

Various tests described in the accompanying examples were carried out to demonstrate the effectiveness of the practice of this invention for the treatment of raw fruits to inhibit decay. In all the tests, unless otherwise specified the fruit was inoculated with a water suspension of *Penicillium digitatum* or *Penicillium italicum* spores. After inoculation the fruit was permitted to dry and then selected at random into lots for treatment. All treatments, unless specified otherwise, comprised a contacting operation with an aqueous wash containing a cobalt compound, followed by a fresh water rinse. After treatment the fruit was stored in a room maintained at a temperature of about 70° F. at about 90-95% relative humidity for periods as long as 3-4 weeks. Under such conditions the inoculated, untreated fruit developed most of the decay within 4 to 7 days.

Example I

Tests were carried out to show the effectiveness for decay control of the cobalt-containing aqueous treating washes in accordance with this invention. In these tests inoculated lemons were dipped for two minutes in various cobalt-containing washes containing, additionally, 0.02% of a surfactant or detergent, such as an alkyl aryl sulfonate dissolved therein. The temperature of the wash solution during the dipping operation was in the range 117–119° F. The results of these tests are set forth in accompanying Table No. 1:

Example III

Tests were carried out showing the applicability of the practice of this invention to the treatment of fruits wherein the fruit undergoing treatment, instead of being dipped into a treating solution or wash is sprayed with the wash or passed through a curtain of foam of the wash as the fruit passes on brushes or roller conveyor beneath or through the spray or foam. Usually is a spraying or foaming operation the fruit is in contact with the wash for a shorter period of time than in the dipping method. The duration of contact, however, need not necessarily be shorter than in the dipping method. The results of these tests employing spray type equipment for the application of the treating solution to the produce are set forth in accompanying Table No. 3:

TABLE NO. 1

| | Aqeous Wash Containing | Percent Decay | | | |
|---|---|---|---|---|---|
| | | 5 days | 10 days | 18 days | 24 days |
| 1 | Cobalt Free | 96 | | | |
| 2 | 3% Soda Ash | 48 | 68 | 72 | 72 |
| 3 | 0.2% Cobaltous Chloride | 16 | 28 | 56 | 60 |
| 4 | 0.4% Cobaltous Chloride | 12 | 12 | 32 | 32 |
| 5 | 0.2% Cobaltous Acetate | 20 | 44 | 52 | 52 |
| 6 | 0.42% Cobaltous Acetate | 4 | 4 | 12 | 20 |
| 7 | 0.24% Cobaltous Sulfate | 12 | 20 | 32 | 36 |
| 8 | 0.48% Cobaltous Sulfate | 8 | 12 | 24 | 40 |
| 9 | 0.1% Cobaltous Carbonate | 4 | 20 | 24 | 24 |
| 10 | 0.2% Cobaltous Carbonate | 12 | 24 | 24 | 28 |
| 11 | 0.16% Cobaltous Formate | | 16 | 32 | 44 |
| 12 | 0.32% Cobaltous Formate | 4 | 4 | 16 | 16 |
| 13 | 0.335% Cobaltous Ammonium Sulfate | 4 | 12 | 36 | 44 |
| 14 | 0.67% Cobaltous Ammonium Sulfate | 4 | 16 | 24 | 32 |

Cobaltous chloride—$CoCl_2 \cdot 6H_2O$
Cobaltous acetate—$Co(C_2H_3O_2)_2 \cdot 4H_2O$
Cobaltous sulfate—$CoSO_4 \cdot 7H_2O$
Cobaltous formate—$Co(HCOO)_2 \cdot 2H_2O$
Cobaltous ammonium sulfate—$CoSO_4(NH_4)_2SO_4 \cdot 6H_2O$ In the tests results presented in Table No. 1 amounts of the above-identified cobalt compounds were employed to give cobalt concentrations in the tests washes at two levels of cobalt content, 0.05% and 0.1% by weight. The cobaltous carbonate employed had an average particle size in the range 2–3 microns.

Example II

Additional tests under conditions substantially the same as those described in conection with Example 1 were carried out. The results of these additional tests are set forth in accompanying Table No. 2:

TABLE NO. 3.—DECAY CONTROL OF LEMONS WITH COBALT SOLUTION SPRAY TREATMENT, 0.5% COBALTOUS SULFATE SOLUTION

| Treatment: | Percent decay after 17 days |
|---|---|
| Cobalt free wash | 74 |
| 2–3 second spray | 58 |
| 5 second spray | 48 |
| 15 second spray | 42 |
| 30 second spray | 26 |

TABLE NO. 2

| | Aqueous Wash Containing | Percent Decay | | | |
|---|---|---|---|---|---|
| | | 6 days | 11 days | 18 days | 20 days |
| 1 | Cobalt Free | 72 | 84 | 88 | 88 |
| 2 | 3% Soda Ash | 60 | 64 | 68 | 68 |
| 3 | Cobaltous Citrate (equivalent to 0.4% $CoCl_2$) | 16 | 36 | 40 | 40 |
| 4 | Cobaltous Tartrate (equivalent to 0.4% $CoCl_2$) | 36 | 40 | 56 | 56 |
| 5 | Cobaltous Soap (equivalent to 0.4% $CoCl_2$) | 36 | 60 | 72 | 72 |
| 6 | Cobaltous Sulfate 0.49% | 16 | 36 | 44 | 44 |

Example IV

Additional tests were carried out to demonstrate the effectiveness of the practice of this invention with washes of varying content. The results of these tests are set forth in accompanying Tables Nos. 4 and 5.

TABLE NO. 4.—EFFECT OF COBALT CONTENT IN WASH ON DECAY CONTROL OF LEMONS—WASH TANK DIP—2 MINUTES

| | Treatment | Percent Decay | |
|---|---|---|---|
| | | 10 days | 15 days |
| 1 | Cobalt free | [1] 84 | |
| 2 | 0.01% Cobaltous Chloride | 64 | |
| 3 | 0.25% Cobaltous Chloride | 28 | |
| 4 | 0.50% Cobaltous Chloride | 20 | |
| 5 | 0.75% Cobaltous Chloride | 8 | |

[1] 4 days.

TABLE NO. 5

| | Treatment | Percent Decay | |
|---|---|---|---|
| | | 10 days | 15 days |
| 6 | Cobalt free | | 54 |
| 7 | 0.0625% Cobaltous Carbonate | | 22 |
| 8 | 0.125% Cobaltous Carbonate | | 28 |
| 9 | 0.25% Cobaltous Carbonate | | 12 |
| 10 | 0.50% Cobaltous Carbonate | | 12 |
| 11 | 0.75% Cobaltous Carbonate | | 8 |

Example V

Further tests were carried out to show the effectiveness of the practice of this invention employing cobalt washes at various temperatures. The results of these tests are set forth in accompanying Tables Nos. 6 and 7:

TABLE NO. 6.—EFFECT OF TREATING TEMPERATURE ON DECAY CONTROL OF LEMONS

| Treatment | Percent Decay | | | |
|---|---|---|---|---|
| | 70° F. | | 110° F. | |
| | 4 days | 10 days | 4 days | 10 days |
| Cobalt free | 92 | 92 | 84 | 84 |
| 0.10% Cobaltous Chloride | 40 | 60 | 31 | 64 |
| 0.25% Cobaltous Chloride | 12 | 40 | 4 | 28 |
| 0.50% Cobaltous Chloride | | | 0 | 20 |
| 0.75% Cobaltous Chloride | | | 0 | 8 |

TABLE NO. 7

| Treatment | Percent Decay | | | |
|---|---|---|---|---|
| | 70° F. | | 110° F. | |
| | 4 days | 11 days | 4 days | 11 days |
| Cobalt free | 92 | 92 | 96 | 96 |
| 0.25% Cobaltous Chloride | 32 | 68 | 0 | 28 |
| 0.50% Cobaltous Chloride | 8 | 40 | 0 | 12 |

It is to be noted that the special cobalt containing washes of this invention are effective at a relatively high temperature, about 110° F., and at room temperature, about 70° F. This is not true of conventional treating agents, such as borax and soda ash which are ineffective at room temperature.

In fact the cobalt containing washes are effective at a temperature as low as about 32° F., the freezing point of water. Accordingly, in the practice of this invention, it may be convenient to refrigerate the cobalt containing wash and to employ the cooled wash, as in a Hydrocooler apparatus, to effect preliminary or at least partial cooling or refrigeration of the treated fruit before storage or shipment. Thus the washing operation of this invention may be carried out at a temperature in the range 35° F.–120° F. When the cobalt wash is employed in the Hydrocooler apparatus the contact time of the fruit undergoing treatment is rather long, up to about 20–30 minutes, more or less. However, the effectiveness of the wash treatment, as compared with treatment at a temperature from about room temperature up to about 110° F.–115° F., is relatively less at lower temperatures. In the Hydrocooler treatment it may be desirable to employ a relatively insoluble cobalt compound, such as cobaltous carbonate, since the fruit being treated is in contact with the cobalt wash for a relatively long period of time. In general the higher the cobalt content of the wash, particularly the dissolved cobalt content, the shorter the contact time effective to prevent decay. Aqueous washes having a cobalt content as low as about 0.005% by weight and as high as about 2% by weight are effective in the practice of this invention to prevent fruit decay.

Example VI

Tests were carried out in spray type equipment to demonstrate the effectiveness of the washes in accordance with this invention as compared with a sodium orthophenylphenate containing wash. It was observed that washes in accordance with this invention containing from about 1 to about 4% cobaltous sulfate gave a much better decay control than the 2% sodium orthophenylphenate washes. The results of these tests are set forth in accompanying Table No. 8:

TABLE NO. 8.—COMPARISON OF COBALT SULFATE VS. SODIUM ORTHOPHENYLPHENATE ON DECAY CONTROL OF LEMONS.

| Wash containing: | Percent decay |
|---|---|
| Cobalt free | 100 |
| 2.0% sodium ortho-phenylphenate | 32 |
| 0.25% cobaltous sulfate | 30 |
| 0.50% cobaltous sulfate | 16 |
| 1.0% cobaltous sulfate | 8 |
| 2.0% cobaltous sulfate | 7 |
| 3.0% cobaltous sulfate | 5 |
| 4.0% cobaltous sulfate | 4 |

Example VII

Tests were also carried out to show the influence of pH upon the effectiveness of cobalt containing washes of this invention. In these tests lemons were dipped for about 2 minutes into 0.5% cobaltous chloride solutions maintained at a temperature in the range 110°F.–115° F. and at various pH. Often it is desirable to incorporate an alkaline detergent in the wash, resulting in some instances in a wash having a relatively high pH, such as a pH of about 9.0. It is preferred however to employ a wash having a pH below about 7.0, desirably not lower than about 3.5.

The results of these tests are set forth in accompanying Table No. 9:

TABLE NO. 9

| pH of treating solution: | Percent decay (17 days) |
|---|---|
| 8.6 | 75 |
| 7.3 | 25 |
| 3.7 | 0 |

Example VIII

Tests were carried out to demonstrate the effectiveness of the practice of this invention as applied to oranges. In these tests oranges were immersed in various cobalt containing washes maintained at a temperature in the range 100° F.–105° F. for a period of about 2 minutes.

The results of these tests are set forth in accompanying Table No. 10:

TABLE NO. 10

| Wash containing: | Percent decay (11 days) |
|---|---|
| (1) Cobalt free | [1] 92 |
| (2) 0.05% cobaltous sulfate | 84 |
| (3) 0.125% cobaltous sulfate | 60 |
| (4) 0.25% cobaltous sulfate | 32 |
| (5) 0.05% cobaltous acetate | 72 |
| (6) 0.125% cobaltous acetate | 44 |
| (7) 0.25% cobaltous acetate | 36 |
| (8) 0.05% cobaltous carbonate | 24 |
| (9) 0.125% cobaltous carbonate | 36 |
| (10) 0.25% cobaltous carbonate | 12 |

[1] 7 days.

*Example IX*

Further tests were carried out to demonstrate the effectiveness of the practice of this invention employing spray type equipment for the treatment of oranges and also to demonstrate the superiority of the cobalt-containing washes of this invention over sodium ortho-phenylphenate containing washes. The results of these tests are set forth in accompanying Table No. 11:

TABLE NO. 11

| Wash Containing | Percent Decay | |
|---|---|---|
| | 6 days | 21 days |
| Cobalt free | 80 | 84 |
| 1% Sodium ortho-phenylphenate | 28 | 56 |
| 2% Cobaltous Sulfate | 20 | 40 |
| 4% Cobaltous Sulfate | 0 | 32 |
| 2% Cobaltous Acetate | 20 | 48 |
| 3% Cobaltous Acetate | 0 | 44 |
| 4% Cobaltous Acetate | 12 | 12 |

Similar tests demonstrated the effectiveness of the cobalt containing washes of this invention for the treatment of grapefruit.

*Example X*

Further tests were carried out to demonstrate the effectiveness of the practice of this invention for decay control of peaches. In these tests the peaches were inoculated with a water suspension of *Sclerotinia fructicola* (brown rot) spores. The inoculated peaches were dried and then arranged at random into lots for treatment by dipping in cobalt containing washes. Following treatment the peaches were stored for development of decay under moist atmospheric conditions in a room maintained at about 70° F. Under such conditions untreated peaches usually decay within about 3–4 days. The results of these tests are set forth in accompanying Table No. 12:

TABLE NO. 12.—DECAY CONTROL OF PEACHES WITH COBALT WASH TREATMENT

| Wash containing: | Percent decay (7 days) |
|---|---|
| Cobalt free | 55 |
| 0.2% cobalt sulfate (no rinse) | 47 |
| 0.3% cobalt sulfate (no rinse) | 17 |
| 0.5% cobalt sulfate (dip followed by fresh water rinse) | 14 |
| 1.0% cobalt sulfate (dip followed by fresh water rinse) | 13 |

*Example XI*

Cobalt-containing washes of this invention were also found to be effective for treatment of cantaloupes. In these tests 22 cantaloupes were dipped into a cobalt containing wash, allowed to drain and then placed in storage at a temperature of 45° F. and at 80% relative humidity for 10 days. The cantaloupes were then transferred to another storage room maintained at a temperature of 70° F. and in a moist atmosphere. The cantaloupes were then scored for amount of mold after 3 days. In these tests the stem ends and the surfaces were each scored separately with a 0, 1 and 2 ratings. A rating of 0 indicates freedom from mold, a rating of 1 means the stem end is one-half covered with mold or the surface has a few moldy spots and a rating of 2 means the stem is completely covered with mold and the surface has several moldy areas. The results of these tests as compared with 22 untreated cantaloupes are set forth in accompanying Table No. 13:

TABLE NO. 13

| | Untreated | 0.5 CoSO$_4$. 7H$_2$O Wash |
|---|---|---|
| Stem End Mold: | | |
| No. of melons scoring 0 | None | 4 |
| No. of melons scoring 1 | 1 | 4 |
| No. of melons scoring 2 | 21 | 14 |
| Surface Mold: | | |
| No. of melons scoring 0 | 0 | 9 |
| No. of melons scoring 1 | 1 | 9 |
| No. of melons scoring 2 | 21 | 4 |

As will be apparent to those skilled in the art in the light of the foregoing disclosure many modifications, substitutions and alternations are possible in the practice of this invention without departing from the spirit or scope thereof.

We claim:
1. A method of treating raw fruit and the like to inhibit decay during shipment and/or storage which comprises contacting the same with an aqueous wash containing a cobalt compound.
2. A method in accordance with claim 1 wherein said cobalt compound is selected from the group consisting of cobalt oxides, cobalt hydroxides and cobalt salts of inorganic and organic acids.
3. A method in accordance with claim 1 wherein said contacting operation is carried out by immersing the fruit in a body of said aqueous wash.
4. A method in accordance with claim 1 wherein said contacting operation is carried out by spraying the fruits with said aqueous wash.
5. A method in accordance with claim 1 wherein said contacting operation is carried out by applying a foam of said aqueous wash to the fruit.
6. A method in accordance with claim 1 wherein said contacting operation is carried out at a temperature in the range from about 35° F. to about 120° F.
7. A method in accordance with claim 1 wherein the cobalt content of said aqueous wash is in the range from about 0.005% by weight to about 2% by weight.
8. A method in accordance with claim 1 wherein the cobalt content of said aqueous wash is in the range from about 0.005% by weight to about 2% by weight and wherein the fruit is in contact with said aqueous wash for a period of time in the range from about 2–3 seconds to about 30 minutes.
9. A method in accordance with claim 1 wherein said cobalt compound is a cobaltous compound.
10. A method in accordance with claim 1 wherein said cobalt compound is cobaltous carbonate.
11. A method in accordance with claim 1 wherein said cobalt compound is cobaltous chloride.
12. A method in accordance with claim 1 wherein said cobalt compound is cobaltous acetate.
13. A method in accordance with claim 1 wherein said cobalt-containing compound is cobaltous sulfate.
14. A method in accordance with claim 1 wherein said cobalt compound is cobaltous formate.
15. A method in accordance with claim 1 wherein the pH of said aqueous wash is in the range from about 9 to about 3.5.
16. A method in accordance with claim 1 wherein the pH of said aqueous wash is in the range from about 3.5 to about 7.

17. A method in accordance with claim 1 wherein following the contacting operation the resulting treated raw fruit is subjected to a water rinse.

18. A method of treating citrus fruits, such as lemons, oranges, grapefruits, limes, tangerines and the like to inhibit decay during shipment and/or storage which comprises contacting the same with an aqueous wash containing a cobalt compound.

19. A method of treating stone fruits, such as peaches, cherries, nectarines, apricots, plums and the like to inhibit decay during shipment and/or storage which comprises contacting the same with an aqueous wash containing a cobalt compound.

20. A method of treating melons, such as cantaloupes, watermelons, honeydew melons, Persian melons, Cranshaw melons and the like which comprises contacting the same with an aqueous wash containing a cobalt compound.

21. A method in accordance with claim 1 wherein said cobalt compound is a cobalt salt of an acid whose anion is non-toxic.

References Cited
UNITED STATES PATENTS

| | | | |
|---|---|---|---|
| 1,704,456 | 3/1929 | Barger | 99—156 |
| 1,797,573 | 3/1931 | Fulton et al. | 99—156 |

OTHER REFERENCES

Percival: Cobalt Salts of Ion Exchange Resins in Dermatological Preparations, October 1962, American Perfumer and Cosmetics, pp. 143–145.

Shade: Cobalt and Bacterial Growth, J. Bacteriology, vol. 58, pp. 811–812, 820–821.

Blanck—Handbook of Food and Agriculture, Reinhold Pub. Corp., N.Y., 1955, pp. 170, 171, 174.

A. LOUIS MONACELL, *Primary Examiner.*

M. VOET, *Assistant Examiner.*